United States Patent [19]
Sekida

[11] 3,961,347
[45] June 1, 1976

[54] INTERCHANGEABLE OBJECTIVE LENS DIAPHRAGM EXPOSURE CONTROL COUPLING MECHANISM

[75] Inventor: Minoru Sekida, Sakai, Japan

[73] Assignee: Minolta Camera Kabushiki Kaisha, Osaka, Japan

[22] Filed: Jan. 23, 1975

[21] Appl. No.: 543,571

[30] Foreign Application Priority Data
Feb. 5, 1974   Japan.............................. 49-14089

[52] U.S. Cl................................. 354/272; 354/46
[51] Int. Cl.²....................... G03B 9/02; G03B 7/20
[58] Field of Search ............. 354/40, 46, 270, 272, 354/38, 50, 51, 60 R

[56] References Cited
UNITED STATES PATENTS

| 3,461,783 | 8/1969 | Fujii .................... | 354/46 X |
| 3,589,252 | 6/1971 | Hahn et al. ............ | 354/46 X |
| 3,683,765 | 8/1972 | Iura..................... | 354/46 |
| 3,699,868 | 10/1972 | Shimomura............ | 354/46 |

FOREIGN PATENTS OR APPLICATIONS

| 848,904 | 9/1952 | Germany ............... | 354/46 |

Primary Examiner—L. T. Hix
Assistant Examiner—James LaBarre
Attorney, Agent, or Firm—Wolder & Gross

[57] ABSTRACT

A mechanism for transmitting the position of a diaphragm ring of a camera interchangeable lens to an exposure control device in the camera interchangeable viewer, a mechanism is mounted on the housing and includes a fixed gear, a mounting arm swingable about the fixed gear and having a sector shaped outer end which supports a rotatable gear which is coupled to the fixed gear by an idler gear carried by the mounting arm. A connector arm has one end connected to and moveable and rotatable with the rotatable gear, and is provided at its outer end with a coupling pin which separably engages a coupling element carried by the diaphragm ring. A flexible line extends from the outer end of the mounting arm along the periphery of the arm sector shaped end to the exposure control device and is spring loaded. The fixed and rotatable gears may be replaced by pulleys coupled by a flexible belt. The end of the connector arm traverses a circular path corresponding to that of the diaphragm ring coupling element.

11 Claims, 7 Drawing Figures

INTERCHANGEABLE OBJECTIVE LENS DIAPHRAGM EXPOSURE CONTROL COUPLING MECHANISM

BACKGROUND OF THE INVENTION

The present invention relates to improvements in diaphragm coupling or interlock devices for use in an interchangeable lens type camera, by which the aperture value set by the lens diaphragm setting member which operates to preset the diaphragm aperture in the interchangeable lens, is transmitted to an exposure control mechanism located in the camera body.

Among the known interlocking devices of the present type is one which is provided with a coupling element secured to a diaphragm setting ring which is rotatable relative to the interchangeable objective lens barrel, and a pantograph mechanism which may be interlocked with the coupling element, or one which is provided with a pin engageable with the coupling element and an arcuate rail concentric with the center of rotation of the coupling element.

However, both the pantograph mechanism and the arcuate rail occupy considerable space, and thus considerably increase the size and bulk of the camera. In addition, great difficulties are encountered in the connection of an exposure control mechanism which is mounted in a finder casing removable from a camera body. Furthermore, the pin engaged with the rail has to slidingly rotate relative to the camera body or relative to the finder casing on the camera body, so that a smooth rotation in association with the movement of the diaphragm setting ring is not achieved.

SUMMARY OF THE INVENTION

It is a principal object of the present invention to provide a diaphragm interlocking or coupling device for use in an interchangeable lens type camera, in which a connecting member moves in accordance with the extent of displacement of the diaphragm setting member of an interchangeable lens and the displacement of the connecting member is transmitted as an aperture value to an exposure control mechanism.

It is another object of the present invention to provide a diaphragm interlocking device for use in a lens interchangeable type camera, in which a connecting member which is connectable with the diaphragm setting member of an interchangeable objective lens is secured to a revolving member which revolves around a fixed member and rotates about its own axis, thereby reducing the space occupied by the diaphragm interlocking mechanism housed in the camera body, contributing to a compact camera size and affording a smooth operation of the diaphragm interlocking device.

It is a further object of the present invention to provide a diaphragm interlocking device for use in an interchangeable objective lens type camera, in which, even if the diaphragm interlocking device is provided within an interchangeable pentaprism viewer removeable from the camera body, the extent of manipulation of the diaphragm setting member may be positively transmitted to an exposure control means.

The above and other objects and features of the present invention may be readily attained in a diaphragm interlocking device of the type described, which comprises a fixed member provided on the body of a camera, a revolving member which revolves around the fixed member and rotates on its own axis, a connecting member secured to the revolving member and connectable with a diaphragm setting member of an interchangeable lens, and means for transmitting the displacement of the connecting member to an exposure control means.

BRIEF DESCRIPTION OF THE DRAWINGS

FIG. 7 is a front view of another embodiment of the present invention.

DESCRIPTION OF THE PREFERRED EMBODIMENTS

Figure 1:
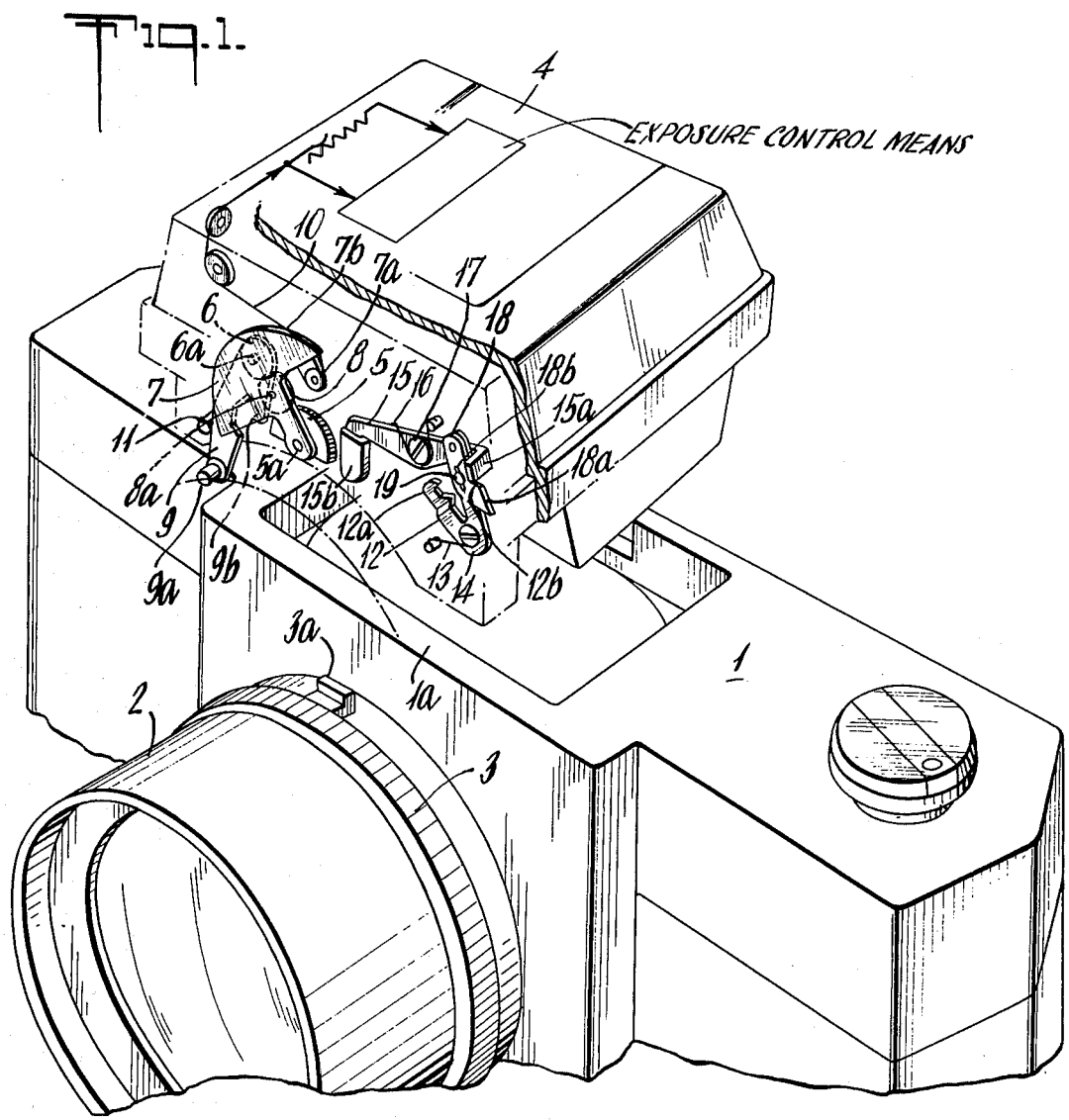
FIG. 1 is a perspective view, partly broken away, of the essential parts of one embodiment of the present invention.

Referring now to the drawings, particularly FIGS. 1 to 4 thereof which illustrate a preferred embodiment of the present invention, the reference numeral 1 generally designates a camera body which is provided with an objective lens barrel 2 interchangeably mounted thereon and a finder casing 4 removeably mounted on the camera body in communication with the objective lens.

When the interchangeable objective lens 2 and the finder casing 4 are properly mounted on the camera body 1, a coupler element or pawl 3a affixed to a diaphragm setting ring 3, which is rotatable relative to the lens barrel, is engageable with an engaging or coupling pin 9a located on a connecting member 9 which will be hereinafter described, the connecting member 9 being disposed within the finder casing 4.

A fixed or stationary gear 5 is rigidly mounted on the finder casing 4 and is substantially housed therein. A rotatable gear 6 is drive coupled by way of an idle gear 8 to the fixed gear 5. A sector member or arm 7 is pivoted to a pivot 5a which is mounted at the center of the fixed gear 5. The revolving gear 6 and idle gear 8 are both pivoted to the sector arm 7 by means of a pivot 6a and a pivot 8a, respectively. Accordingly, when the revolving gear 6 revolves together with the sector arm 7 around the fixed gear 5, the gear 6 rotates on its axis 6a. The gear ratio of the gear 6 to the fixed gear 5 is set to a ratio which will be hereinafter described.

A flexible wire or line 10 has one end thereof secured to the sector arm 7 by means of a fastening piece 7a and extends along a cam groove 7b formed in the peripheral portion of the sector arm 7, the other end of the line 10 being connected to an exposure control means which is provided within the finder casing. The line 10 is normally pulled in a direction toward the exposure control means, thereby resiliently loading or biasing the sector arm 7 so as to rotate in the counterclockwise direction.

A connecting arm or member 9 is secured at one end to the revolving gear 6 and is formed with an engaging pawl 9b at one edge thereof and is provided at its opposite end with an engaging pin 9a engageable with the coupler pawl 3a.

With the coupler pawl 3a in engagement with the engaging pin 9a, when the diaphragm setting ring 3 is rotated in the clockwise direction, then the coupler pawl 3a urges the engaging pin 9a in the same direction. This causes gear 6 to rotate on its axis in the counter-clockwise direction, so that it revolves in the clockwise direction around the fixed gear 5 by way of the idle gear 8, and the sector arm 7 rotates in the clockwise direction about the pivot 5a to pull the wire 10 opposite to the direction in which the wire is spring drawn. On the other hand, when the diaphragm setting ring is rotated in the counter-clockwise direction, then the tendency of the wire to be pulled under the spring influence rotates the sector arm 7 in the counter-clockwise direction, so that the gear 6 revolves about gear 5 in the counter-clockwise direction, but rotates in the clockwise direction on its own axis, and the engaging pin 9a follows the coupler pawl 3a. As is clear from the foregoing, the clockwise and counter-clockwise rotations of the setting ring 3 draws the wire 10 against the spring pull thereon and pays out the wire 10, respectively, thereby transmitting diaphragm aperture information to the exposure control means.

A pin 11 serves as a stop which limits the clockwise rotation of the connecting member 9 due to the spring influence on wire 10 when the engaging pin 9a is disengaged from the coupler pawl 3a.

For transmitting the aforesaid operation to the exposure control means irrespective of the aperture value set by the setting ring 3, it is necessary that the coupler pawl 3a and the engaging pin 9a maintain an engaging relationship, independently of the position of the revolving gear 6. Furthermore, for maintaining the aforesaid relationship, it is necessary that a predetermined gear ratio be maintained between the fixed gear 5 and the revolving gear 6, as has been earlier set forth.

Figure 5:
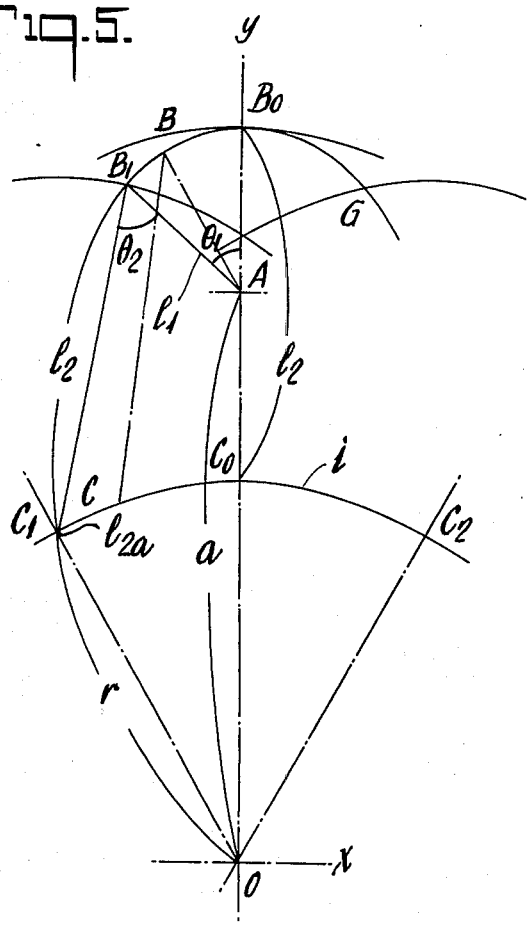
FIG. 5 is a diagram illustrating the operation of the coupling mechanism.

Now, a more detailed description will be given of the aforesaid gear ratio relationship, by referring to FIGS. 5 and 6. In FIG. 5, the point O represents the center of rotation of the coupler pawl 3a, and the coupler pawl 3a follows an arc $i$ having a radius $r$ ($OC_1$, $OC$, $OC_0$, $OC_2$) about the center O; the pivot 5a of the fixed gear 5 is shown at point A; the revolving radius of the revolving gear 6 has a length $l_1$ ($AB1$, $AB$, $AB_0$); the distance between the pivot 6a on the connecting member 9 and the engaging pin 9a is represented as a length $l_2$ ($B_1C_1$, $BC$, $B_0C_0$); the revolving angle of the revolving gear 6 is represented as an angle $\theta_1$, i.e., the rotational angle of the sector arm 7; the rotating angle of the revolving gear 6 on its axis is represented as an angle $\theta_2$; and the distance from the center of rotation to the pivot 5a of the fixed O 5 is represented as a length $a$.

Still referring to FIG. 5, suppose a four joint link consisting of four link members $\overline{OA}$ ($a$), $\overline{AB}$ ($l_1$), $\overline{BC}$ ($l_2$), $\overline{CO}$ ($r$), then $$a + l_1 = l_2 + r$$

wherein the link member $\overline{OA}$ is a fixed link member, assume the point O which is the original point of the coordinates, fixed link $\overline{OA}$ which is represented by the y axis, and the intersection $B_0$ of the link $\overline{AB}$ with the y axis, and $$\angle BAB_0 = \theta_1$$

$$\angle ABC = \theta_2,$$

then the point C ($X_c$, $Y_c$) is given as follows:

$$X_c = l_1 \sin \theta_1 + l_2 \sin (\theta_2 - \theta_1) \quad (1)$$

$$Y_c = d + l_1 \cos \theta_1 - l_2 \cos (\theta_2 - \theta_1)$$

Thus, $$r^2 = X_c^2 + Y_c^2 = d^2 + l_1^2 + l_2^2 + 2dl_1 \cos \theta_1 - 2l_1 l_2 \cos \theta_2 - 2dl_2 \cos (\theta_2 - \theta_1) \quad (2)$$

Figure 6:
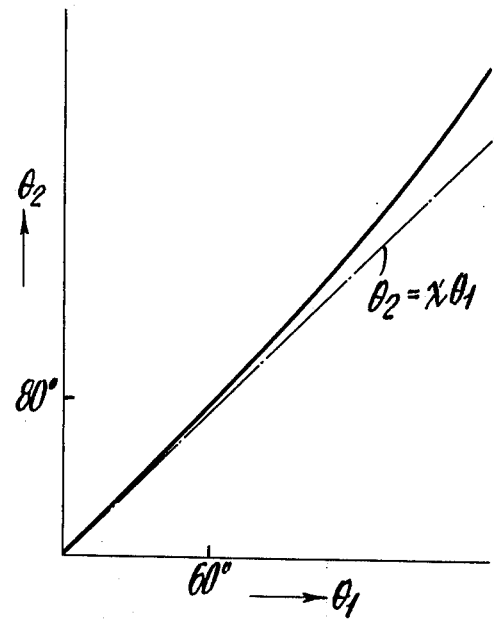
FIG. 6 is a diagram showing the relationship between an angle $\theta_1$ and an angle $\theta_2$.

When the relationship between $\theta_1$ and $\theta_2$ is determined by selecting $r$, $a$, $l_1$, $l_2$ at suitable values, the relationship shown by the solid line in FIG. 6 may be obtained. As is clear from FIG. 6, if the angle $\theta_1$, remains within a certain angular range, the aforesaid relationship approximates the following linear relationship:

$$\theta_2 = \lambda \theta_1$$

Figure 2:
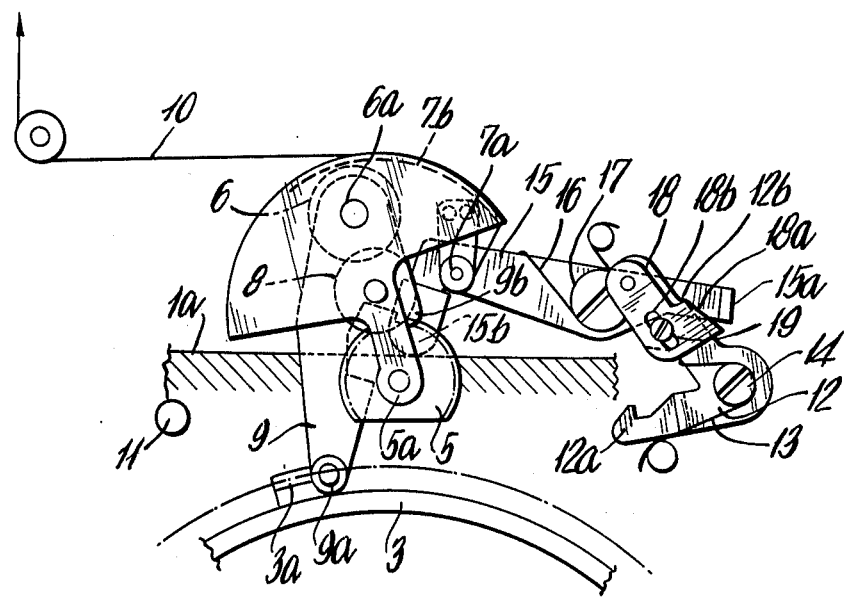
FIG. 2 is a front elevational view of the coupling mechanism of the embodiment of FIG. 1, showing the interchangeable lens and the finder casing properly mounted on the body of the camera.
Figure 3:
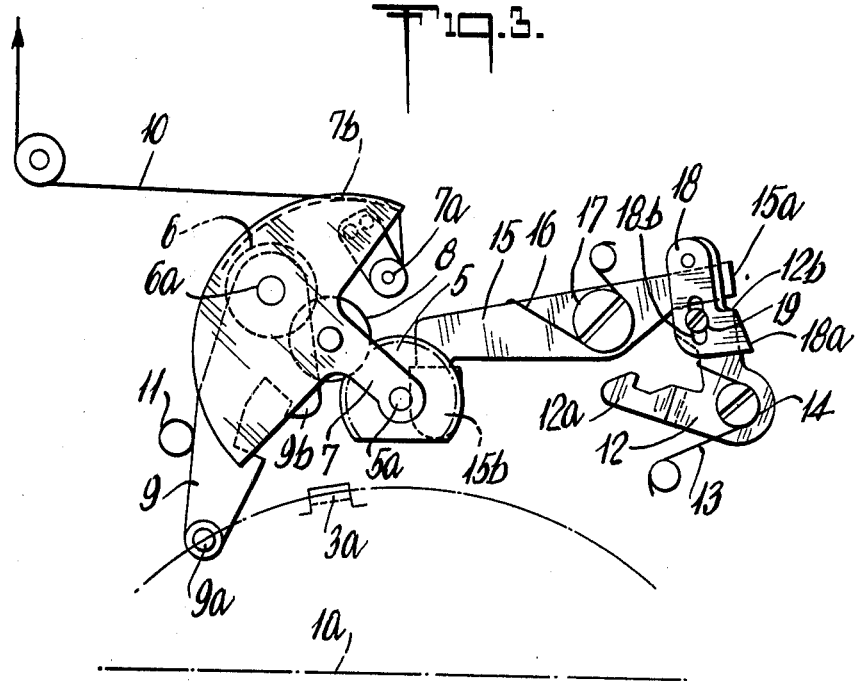
FIG. 3 is a front view of the coupling mechanism, showing the finder casing removed from the camera body.

This demonstrates that, even if the aforesaid four joint link is devoid of the link member $\overline{OC}$, the tip $C_{BC}$ of the arm $\overline{BC}$ will describe an arc approximately the arc described by the tip $C_{OC}$ of the link member $\overline{OC}$, if the relationship $\theta_2 = \lambda \theta_1$ is maintained. This further indicates that, for defining the arc described by the coupler pawl 3a commensurate with the diaphragm setting as being an arc $C_1C_2$ within a given rotational angle as well as for causing the engaging pin 9a of the connecting member 9 to move within the locus approximating the aforesaid arc $C_1C_2$, the gear ratio $Z1/Z2$ of the fixed gear 5 to the revolving gear 6 should be $\lambda = \theta_2/\theta_1$, i.e., $\lambda = \theta_2/\theta_1 = Z_1/Z_2$, In addition to the aforesaid relationship, since the interchangeable lens 2 and finder casing 4 are both removeable from the camera body 1, when the interchangeable lens 2 and finder casing 4 are both mounted on the camera body 1, the relationship between the coupler pawl 3a and the engaging pin 9a should be such that the pin 9a engages the righthand portion of the coupler pawl 3a, as shown in FIG. 2. Conversely, when the relationship of the both members are reversed as shown in FIG. 3, then there results a failure to transmit an aperture value set by the diaphragm setting ring 3 to the exposure control means by means of the wire 10. To avoid the aforesaid failure, the present embodiment permits proper mounting of the finder casing 4 on the camera body 1 in the case as shown in FIG. 3.

Specifically, an angular locking lever 12 is pivoted at its elbow on the finder casing by means of a shaft 14 and loaded by means of a spring 13 so as to be biased to rotate in the clockwise direction. The locking lever 12 has formed on one arm a locking pawl 12a which is engageable with an engaging hook 9b and on its other arm with a shoulder portion 12b. A guide screw 19 is positioned on the locking pawl 12.

An adjusting member 18 is provided with a guide groove 18b, with which the guide screw 19 is engaged, and the adjusting member 18 is rigidly fixed, with its position being adjusted in the lengthwise direction. The adjusting member 18 is formed with a slope 18a positioned on the same side of the pivot 14 as the shoulder portion 12b.

A selecting lever 15 is pivoted on the finder casing by means of a pivot 17 and is loaded by a spring 16 so as to be biased to rotate in the counter-clockwise direction. The selecting lever 15 has formed on one arm a bent piece which is engageable with the shoulder portion 12b, and a projecting portion 15b projects downwards from the other arm thereof.

Figure 4:
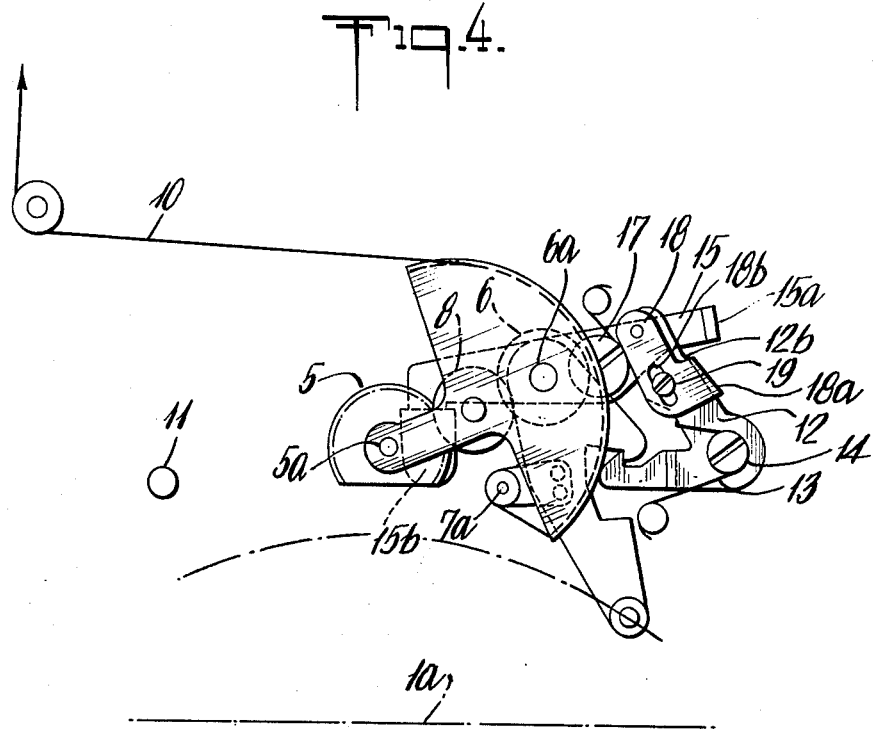
FIG. 4 is a front view of the coupling mechanism, showing the condition of the mechanism set for properly mounting the finder casing to the camera body.

As shown in FIG. 3, the bent piece in engagement with the shoulder portion 12b stops the clockwise rotation of the selecting lever 15 against the action of the spring 16. On the other hand, as shown in FIG. 4, when the aforesaid engagement is released, then the selecting lever 15 is allowed to rotate in the clockwise direction. However, when the selecting lever 15 is rotated in the clockwise direction against the action of the spring 16, then the bent piece 15a will engage the slope 18a, thereby rotating the locking lever 12 in the counter-clockwise direction against the action of the spring 13.

Shown at 1a is a base plate which is provided within the camera body 1 and adapted to engage the aforesaid projecting portion 15b, when the finder casing 4 is mounted on the camera body 1.

As shown in FIG. 3, when the finder casing 4 is to be mounted on the camera body 1, with the bent piece 15a in engagement with the shoulder portion 12b, then the projecting portion 15b will abut the base plate 1a so that the clockwise rotation of the selecting lever 15 is interrupted. Thus, the finder casing is prevented from being mounted on the camera body 1.

When the connecting member 9 is rotated in the counter-clockwise direction against the spring loaded pull of the wire 10, and hence the sector arm 7 is rotated in the clockwise direction manually, then the engaging pawl 9b will engage the locking pawl 12a at its final step of the rotation, so that the locking lever 12 is rotated in the counter-clockwise direction against the action of the spring 13, and the shoulder portion 12b will be retracted from the bent piece 15a, and thus the engagement of both will be released. As a result, when the projecting portion 15b abuts the base plate 1a, with the finder casing 4 being mounted on the camera body 1, then the selecting lever 15 is rotated in the clockwise direction, and the projecting portion 15b is moved upwards, so that the finder casing 4 may be properly mounted on the camera body 1. The bent piece 15a which rotates in the clockwise direction will engage the slope 18a to thereby advance the same so that the engaging pawl 9b is disengaged from the locking pawl 12a. Accordingly, the connecting member 9 is rotated in the clockwise direction under the pulling force of the wire 10, while its engaging pin 9a engages the righthand portion of the coupler pawl 3a, as shown in FIG. 2.

The aforesaid arrangement completely prevents the finder casing 4 from being mounted on the camera body 1 in a manner that the engaging pin 3a is positioned on the lefthand side of the coupler pawl 3a, as shown in FIG. 3.

FIG. 7 shows another embodiment of the present invention in which the gear meshing arrangement of the first embodiment is replaced by a fixed pulley 20 and a belt 22 trained therearound, and about a revolving member 21 which rotates about the center pivot 20a of the fixed member 20. Specifically, the pulley 20 which is affixed to the finder casing takes over the place of and defines the fixed member. In addition, there is provided a sector arm 7 which is identical to that shown in the first embodiment and which is rotatable about the center pivot. Furthermore, the manner in which the wire 10 is secured to the fastening metal piece 7a of the sector arm 7 is the same as that in the first embodiment. The pulley 21 serving as a revolving member is pivoted on the sector arm 7 by means of a pivot 21a. Journalled on the pivot 21a is a connecting member 9 which rotates integrally with the revolving pulley 21. A belt 22 is trained around the revolving pulley 21 and fixed pulley 20, so that the revolving pulley 21 may be revolved about the pivot 20a around the fixed pulley 20 and rotates on its own axis. The other structural details of the present arrangement are the same as those shown in the first embodiment.

In the last described embodiment as well, when the interchangeable lens 2 and the finder casing 4 are properly mounted on the camera body 1, the engaging pin 9a of the connecting member 9 should maintain the engaging relationship with the righthand portion of the coupler pawl 3a. In this case, the following relationship may be obtained. $\lambda = \theta_2/\theta_1 = Z/Z_2$ at the gear ration of $Z_1/Z_2$ of the fixed gear 5 to the revolving gear 5 in the first embodiment, and number of teeth $Z = D/m$, thus $$\lambda = \theta_2/\theta_1 = Z_1/Z_2 = D_1/D_2,$$

wherein $D = a$ diameter, $m =$ module, $D_1 = a$ diameter of the fixed pulley 20, and $D_2 = a$ diameter of the revolving pulley 21.

In other words, even if the fixed gear is replaced by the fixed pulley and the revolving gear is replaced by the revolving pulley, there remains no difference in principle. Thus, it suffices that a specific relationship between the both only be maintained when replacing the gear ratio $\lambda$ in the first embodiment with the diameter ratio.

While in the aforesaid embodiments there is shown a pentaprism view of the interchangeable type, even if the viewer is of a fixed type, the extent of manipulation of the diaphragm setting member may positively be transmitted to the exposure control means. In addition, the present invention is not intended to limit the arrangement as far as such compensation is effected during the time in which the extent of rotation of the diaphragm setting member is transmitted to the final exposure control means.

While there have been described and illustrated preferred embodiments of the present invention, it is apparent that numerous alterations, omissions and additions may be made without departing from the spirit thereof.

I claim:
1. A lens interchangeable type camera including a camera body, an objective lens interchangeably mounted on said camera body and having a rotatable diaphragm ring, and a finder housing, comprising:
   an exposure control means;
   a fixed member disposed in said camera;
   a revolving member rotatable around said fixed member through an interlocking means and rotatable about its own axis;
   a connecting member having one end connected to and rotatable with said revolving member and its other end connectable with said diaphragm ring and moveably interlocking with the movement of said diaphragm ring for moving said diaphragm ring;
   a transmitting means for transmitting the movement of said revolving member to said exposure control means; and an arm member rotatably pivoted at one end to said fixed member, said revolving member being pivoted to said arm member.

2. The camera as set forth in claim 1 wherein said arm member includes a sector shaped section, a peripheral portion of said sector shaped section defining a cam forming part of said transmitting means.

3. The camera as set forth in claim 1 including a shaft rotatably mounting said revolving member and said connecting member to said arm member.

4. The camera as set forth in claim 1 wherein said finder housing is interchangeable, and said exposure control means, said fixed member, said revolving member, said connecting member and said transmitting means are disposed in said finder housing.

5. The camera as set forth in claim 1 wherein said fixed member and said revolving member comprise a fixed gear and a revolving gear respectively, and said interlocking means comprises an interlocking gear meshed with said fixed gear and said revolving gear.

6. The camera as set forth in claim 1 wherein said fixed member and said revolving member comprise a fixed pulley and revolving pulley respectively, and said interlocking means comprises a belt trained around said fixed pulley and revolving pulley.

7. In a camera including an interchangeable objective lens having a diaphragm control ring and an adjustable exposure control device, a mechanism for transmitting the angular position of said diaphragm control ring to said exposure control device comprising a first gear rotatable about a first axis thereof and swingable about a second axis parallel to and offset from said first axis, means including a second gear coaxial with said second axis and a mounting arm swingable about said second axis and rotatably supporting said first gear and means drive coupling said first gear to said second gear for rotating said first gear about its first axis in response to its swinging about said second axis, a connector arm having one end connected to said first gear and being rotatable and moveable therewith and an opposite end coupled to and moveable with said diaphragm control ring and motion transmission means connecting said first gear to said exposure control device.

8. A lens interchangeable type camera including a camera body, an objective lens interchangeably mounted on said camera body and having a rotatable diaphragm with a coupler pawl, and a finder housing, comprising, an exposure control means;
a fixed gear disposed in said camera;
a revolving gear rotatable around said fixed gear and revolvable about its own axis, and an interlocking gear intercoupling said fixed and revolving gears;
a connecting member having one end connected to said revolving gear and being moveable with said revolving gear and its other end connectable with said coupler pawl of said diaphragm ring and moveably interlocking with the movement of said diaphragm ring for moving said revolving gear;
a mounting arm swingable about said fixed gear and rotatably supporting said revolving gear and interlocking gear; and
a transmitting means for transmitting the movement of said revolving gear to said exposure control means.

9. The camera of claim 8 wherein said mounting arm includes a sector shaped section, a peripheral portion of said sector shaped section defining a cam forming part of said transmitting means.

10. The camera of claim 8 including a shaft rotatably mounting said revolving gear and said connecting member to said connecting arm.

11. The camera of claim 8 wherein said finder housing is interchangeable, and said exposure control means, said fixed gear, said revolving gear said connecting member and said transmitting means are disposed in said finder housing.

* * * * *